July 22, 1958

L. L. WITTER 2,844,090

GUARD FRAME FOR ELECTRIC TOASTERS

Original Filed Aug. 30, 1951

INVENTOR
LAWRIE L. WITTER

BY
Kenway, Jenney, Witter & Hildreth
ATTORNEYS

United States Patent Office 2,844,090
Patented July 22, 1958

2,844,090

GUARD FRAME FOR ELECTRIC TOASTERS

Lawrie L. Witter, Newton Highlands, Mass.

Continuation of abandoned application Serial No. 244,433, August 30, 1951. This application January 11, 1954, Serial No. 403,326

3 Claims. (Cl. 99—339)

This application is a continuation of my copending application Serial No. 244,433, filed August 30, 1951, now abandoned.

This invention relates to a novel guard frame for pop-up electric toasters to prevent toast from sliding off the top of the toaster. Pop-up toasters are provided with one or more slice receiving slots open at the top. The tops of these toasters are so rounded laterally downward that one or more slices of toast placed in horizontal position thereon to keep the toast warm will readily slide off. The primary object of the invention comprises the production of a skeleton frame adapted to rest on and cooperate with the toaster to retain slices of toast thereon.

These and other features of the invention will be best understood and appreciated from the following description of preferred embodiments thereof selected for purposes of illustration and shown in the accompanying drawings in which—

Figure 1:
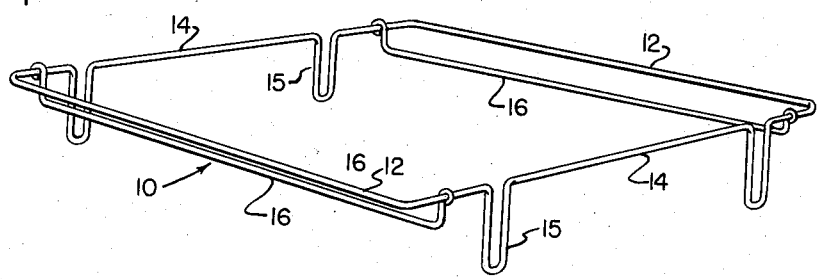
Fig. 1 is a perspective view of a skeleton frame embodying the invention.
Figure 2:
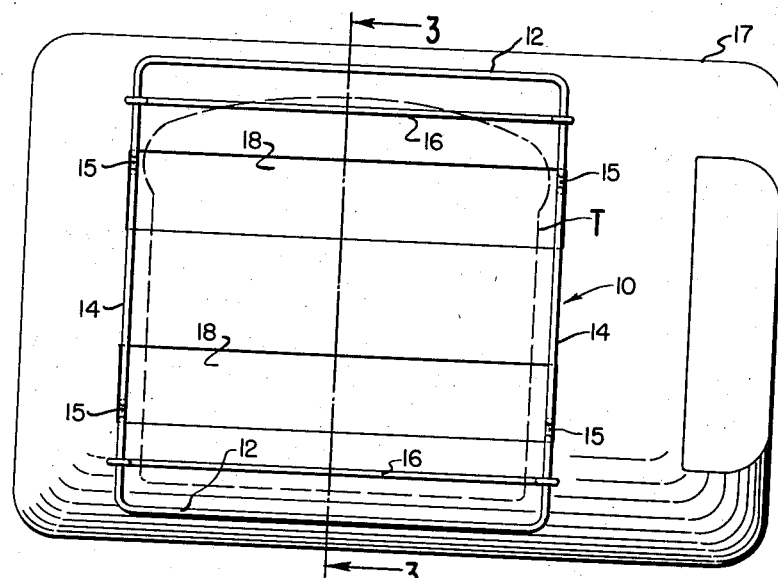
Fig. 2 is a plan view of a toaster with the frame thereon.
Figure 3:
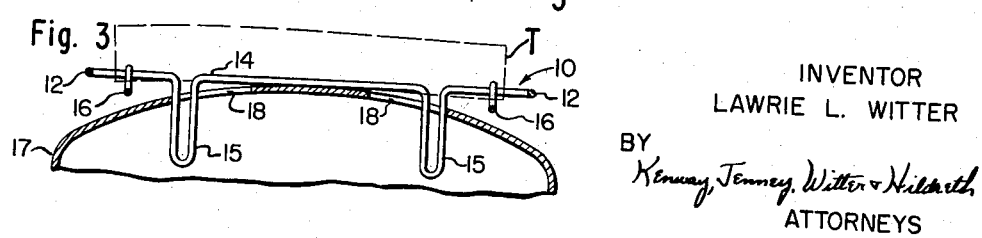
Fig. 3 is a fragmentary sectional view taken on line 3—3 of Fig. 2.

Referring first to Figs. 1, 2 and 3 of the drawings, 10 indicates the frame constructed from a strand of wire and embodying side marginal portions 12 connected to end portions 14. Each end portion is bent downwardly at 15 to provide fingers for extending into the slice receiving slots of a toaster to anchor the frame thereon. A drop wire 16 can also be provided adjacent to the side portions 12 if desired for aiding in supporting the toast.

The toaster 17 illustrated in Figs. 2 and 3 has two slice receiving openings or slots 18. As illustrated in Fig. 3, the top walls of these pop-up toasters are so rounded laterally downward to and merging into the side walls of the toaster that a slice of toast T cannot be supported thereon without falling off at little vibration. The function of the frame is to aid in retaining one or more slices of toast on the toaster where the residual heat left in the toaster will keep the toast warm and fresh until eaten. The frame is seated on the toaster as shown in Figs. 2 and 3 with the fingers 15 extending into the slots 18 in sufficient frictional contact with an end and/or side walls to hold the frame in place. The frame in no manner obstructs the slots 18 and serves to prevent the toast from falling from the toaster. When employed with toasters having a single slice receiving slot, the fingers will be of a width corresponding to the slot, thus holding the tray against lateral movement.

Figure 4:
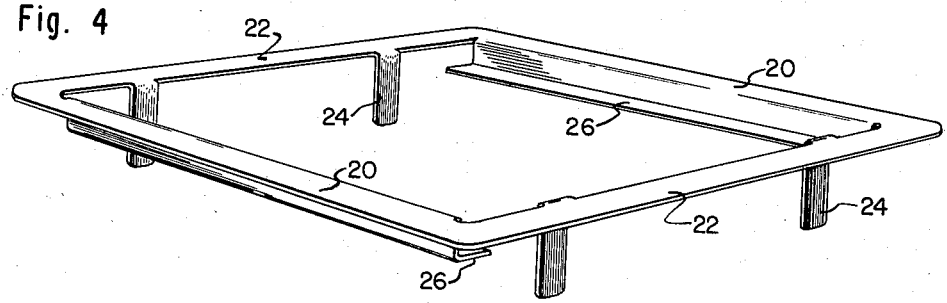
Fig. 4 is a perspective view of a modified form of frame.

In Fig. 4 I have illustrated a frame stamped from a metal sheet and embodying side marginal portions 20, end portions 22 and fingers 24. All portions of the frame are an integral part of the sheet and are of uniform thickness throughout. This frame fits the toaster and functions in the manner above described and can if desired be provided with depressed toast supporting portions 26 adjacent to the side portions 20.

Having thus disclosed my invention what I claim as new and desire to secure by Letters Patent is:

1. In combination with an electric toaster of the pop-up type having a top surface rounded laterally downward to and merging into the side walls of the toaster and having two vertically disposed slice receiving slots through and open at and downwardly from said top surface, a one-piece metal frame embodying two spaced and parallel marginal end portions integrally connected at their ends to the ends of two spaced marginal side portions and in a common plane therewith, and fingers spaced inwardly from the side portions and depending integrally from the end portions and extending downwardly into the ends of said slots to anchor the frame in horizontal position on the toaster with said side portions disposed in spaced relation over and above said downwardly rounded top surface above and adjacent to said side walls of the toaster, the frame being open between said marginal portions to wholly expose said slots and the top surface of the toaster therebetween to receive and support a slice of toast horizontally on and in direct contact with said top surface within said marginal portions.

2. The combination defined in claim 1 in which said side and end portions and fingers comprise a single piece of wire.

3. The combination defined in claim 1 in which said side and end portions and fingers comprise an integral sheet of metal of uniform thickness throughout.

References Cited in the file of this patent

UNITED STATES PATENTS

| 1,006,328 | Widenhofer | Oct. 17, 1911 |
| 2,469,776 | McGee | May 10, 1949 |
| 2,493,222 | Braught | Jan. 2, 1950 |
| 2,556,520 | Bunce | June 12, 1951 |
| 2,640,600 | Farr | June 2, 1953 |

FOREIGN PATENTS

| 16,652 | Great Britain | June 22, 1909 |
| 151,025 | Great Britain | Sept. 23, 1920 |

OTHER REFERENCES

Washburn Catalogue, K–228, page 36, item 1688 (Design).